Patented May 23, 1944

2,349,271

UNITED STATES PATENT OFFICE 2,349,271

PRODUCTION OF TOCOPHEROL OR VITAMIN E

James G. Baxter, Rochester, N. Y., assignor to Distillation Products, Inc., Rochester, N. Y., a corporation of Delaware No Drawing. Application August 30, 1940, Serial No. 354,859

1 Claim. (Cl. 260—333)

This invention relates to the preparation of tocopherol products in ester form and particularly to a method of preparing tocopherol ester having vitamin E activity and good purity.

Alpha tocopherol in acetate form has been previously prepared. However, the yield of the ester has been quite poor. Also the quality of these acetate products has been inferior particularly with respect to pharmaceutical uses when crude starting materials are used. The low potency has been due to the fact that tocopherols oxidize rather easily. This converts them into substances which have no vitamin E activity. This undesirable reaction is hastened by esterification reactions as they were carried out in the prior art.

This invention has for its object to provide procedure for esterification of tocopherols, such as alpha, beta, or gamma tocopherol whereby loss due to oxidation is avoided. A further object is to provide an esterification process in which substantially all of the tocopherol derivatives present in the mixture being esterified are converted into esters having vitamin E activity. A further object is to provide simple procedure for simultaneously esterifying and purifying tocopherol or vitamin E containing substances. A still further object is to provide improved vitamin E products. Other objects will appear hereinafter.

These and other objects are accomplished in accordance with my invention which includes simultaneously esterifying and reducing the tocopherol or vitamin E substance while in the presence of an amine. I have found that reduction during the esterification procedure maintains the tocopherols in the quinone or hydroquinone form and that these are fixed as stable esters by the concurrent esterification reaction. The presence of the amine during the reaction and during the after treatment results in a substantially purer product than is obtained if the material is not present. Accordingly it does not merely act as a catalyst.

In the following description and claim I have set forth several of the preferred embodiments of my invention but it is to be understood that these are given by way of illustration and not in limitation thereof.

The tocopherol or vitamin E product to be treated should preferably contain a relatively high concentration of tocopherol. For instance, I prefer to treat products containing 10 or 15% or more of tocopherol. However, the procedure is applicable to substances which contain as little as 1% tocopherol. For instance it is applicable to the sludges and scums obtained by carrier gas deodorization treatment of vegetable and animal oils. These sludges usually contain about 2–7% tocopherol. They are disclosed in Hickman application 321,913, filed March 2, 1940. The invention is also applicable to concentrates such as those produced by saponification of tocopherol containing oils such as cotton seed and wheat germ oils. It is of particular value in connection with the treatment of tocopherol concentrates produced in the various purification procedures disclosed in the above-mentioned Hickman patent application. Also the invention is applicable to the treatment of tocopherol distillates produced by molecular distillation of natural vegetable oils as described in Hickman and Baxter application #201,018 filed April 8, 1938.

Frequently the tocopherol concentrate or analogous starting material will be found to contain a considerable amount of free fatty acids and glycerides. These substances have no value in connection with the concentrate and are preferably removed before the treatment. This can be accomplished by careful alkali treatment, preferably in the presence of inert gas to avoid oxidation of the tocopherol. A more satisfactory procedure is to add methyl alcohol and sulfuric acid. This converts the free fatty acids and glyceride fatty acids into methyl esters which have a relatively low boiling point. These esters may be left in the concentrate during the application of my invention and removed subsequent thereto by high vacuum distillation. On the other hand, these methyl or equivalent low fatty alcohol esters may be removed immediately by subjecting the treated mixture to high vacuum distillation. In the event that the product containing the methyl esters is directly treated, it is desirable that it be cooled to precipitate sterols and that the excess methyl alcohol be removed by distillation.

The tocopherol product to be treated is reacted with the esterification agent, such as acid halide or anhydride in the ordinary manner common to esterification procedure. The proportions of anhydride, halide and the like and amine are the same as those used for ordinary esterification. For instance, the anhydride may be used in greater than molecular amounts, although this is unnecessary. Smaller amounts than molecular can be used but are not usually recommended. To this esterification mixture is added the reducing agent. A preferred material is zinc dust or similar metal such as iron or tin which yield nascent hydrogen in the presence of the particular reactants present in the esterification mixture. In the case of zinc dust, the reaction with the acid from the anhydride forms nascent hydrogen which reduces the tocopherol in the desired manner. Chemical reducing agents, such as sodium hydrosulphite or stannous chloride may be employed.

After the esterification is complete, the mixture is treated to remove excess esterifying agent and unreacted zinc dust or similar material is removed by filtration. When an acid anhydride has been used a simple method of removing excess thereof is to add methyl alcohol. This forms the methyl ester which can be removed by vacuum distillation. The residue is then a satisfactory tocopherol ester for many purposes. However, I prefer that this product be subjected to high vacuum distillation in order to obtain a product of very high purity.

The invention is applicable to the introduction of acid radicals in general into the tocopherol molecule. Aromatic, cyclo-aliphatic, or aliphatic radicals may be introduced. I prefer to esterify so as to introduce aliphatic monobasic acid radicles since these substances yield esters having desirable properties as regards physical condition, such as ability to form crystalline esters. These aliphatic derivatives are also non-toxic. I prefer to introduce aliphatic acids containing less than 10 carbon atoms, such as the acetate propionate, butyrate, etc. However, stearate, naphthoate, etc. radicles may be given as examples of other types which may be introduced. The esters of beta and gamma tocopherol with aliphatic acids containing 2 to 10 carbon atoms have not heretofore been prepared and are claimed as new products. These esters have the decided advantage over the free tocopherol that they are much more stable. They do not darken to a red color as do freshly distilled tocopherols. The esters, however, have the full vitamin E potency corresponding to their content of tocopherol and may be exposed to air without fear of deterioration. They are, therefore, useful to put vitamin E into foodstuffs where aerial oxidation is likely to occur. I prefer to employ pyridine but other amines such as quinoline diethyl aniline and amyl amine can be used.

*Example*

A tocopherol concentrate is prepared from "clabber stock" (a scum removed from the deodorizer steam condensate from a vegetable oil deodorizing plant), in the following manner: 8 drums of clabber stock each containing 420 lbs. were combined and mixed with about 100 lbs. of commercial hydrochloric acid (1.13 specific gravity). About 20 lbs. of zinc dust were added and the mixture boiled and stirred for about 15 minutes, settled, the bottom acid layer drained off, water added, the mixture boiled, and finally washed until free of mineral acid. The non-aqueous layer was then filtered to remove zinc dust and carbon which was present in the original starting material. This was then dried and degassed by flowing in a thin film by gravity through a chamber evacuated to about .01 mm. The degassed product was then introduced into a multi-column molecular still, the first column being heated to about 170° C. to remove a first fraction containing large amounts of free fatty acids and little tocopherol. The undistilled residue was then distilled on the second column, heated to about 180° C. This fraction was returned to the material introduced into the first still. The undistilled residue from the second still was then distilled in a third still having a column heated to approximately 200° C. This distillate contained tocopherol in approximately 15% concentration. However, it contained impurities of various kinds present in the original sludge and including free fatty acids and oil. In each of the above distillations the vaporizing and condensing surfaces were separated by substantially unobstructed space and the pressure was about .01 to .001 mm.

To 30 lbs. of concentrate produced as above and containing 15% tocopherol there was added 8 gallons of methyl alcohol, 450 gms. of sulfuric acid and 450 gms. of zinc dust. The mixture was heated to about 65-80° C. under gentle reflux for about one hour. The mixture was cooled to cause precipitation of sterols. After filtration of sterols and removal of methyl alcohol 24 pounds of tocopherol and methyl esters was obtained. To this was added 3500 cc. acetic anhydride, 450 cc. pyridine, and 109 g. zinc dust. The zinc dust serves to reduce quinone-like or deeply colored bodies to colorless or hydroquinone forms. These are fixed as the stable acetates by reaction with acetic anhydride. Heating this mixture to 60° C. for 3 hours caused the mixture to lighten in color to pale red. This lightening does not occur when pyridine or other amine is absent even though the pyridine be replaced by such esterification catalysts as sodium acetate and sulphuric acid. The evolution of hydrogen from the reaction mixture is particularly evident when pyridine is present. No reason can be given for this.

After acetylation was complete the excess acetic anhydride was destroyed with methyl alcohol and the readily volatile solvents removed by distillation at 15 mm. pressure and 100° C. The residue was washed with water and distilled under high vacuum, unobstructed path conditions. After removal of the low boiling fraction, chiefly methyl esters at about 90-140° C., tocopherol acetate distilled as a yellow mobile, oil in a series of fractions between 150° and 220° C. with potencies as high as 55%. Preferably the high potency fractions are combined and redistilled whereby a bland, light yellow acetate is obtained suitable for edible use.

Mere presence of reducing gases such as hydrogen will not bring about reduction of tocopherol quinone and the claim is not intended to cover procedure involving the mere use of inert or reducing gases such as hydrogen.

Reference is made to Hickman application 321,913, filed March 2, 1940, which relates to the separation of tocopherol from deodorizer scum.

What I claim is:

The process of preparing a tocopherol product having improved color and stability which comprises reacting a lighter-than-water crude tocopherol preparation derived from the matter volatilized during vacuum steam deodorization treatment of a member of the group consisting of vegetable and animal fats with a substance which will react therewith to form a tocopherol ester of an aliphatic acid said reaction being carried out in the presence of an amine and under reducing conditions sufficiently strong to reduce any tocopherol quinone, which is present in the starting material or formed during the reaction, to tocopherol hydroquinone.

JAMES G. BAXTER.